(12) United States Patent
Giat

(10) Patent No.: US 8,572,568 B2
(45) Date of Patent: Oct. 29, 2013

(54) TEST TOOL FOR CONCURRENT WEB SERVICES AND USER INTERFACE TESTING

(75) Inventor: Hana Giat, Talmon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1127 days.

(21) Appl. No.: 12/251,306

(22) Filed: Oct. 14, 2008

(65) Prior Publication Data

US 2010/0095161 A1 Apr. 15, 2010

(51) Int. Cl.
*G06F 9/44* (2006.01)

(52) U.S. Cl.
USPC .......................................................... 717/124

(58) Field of Classification Search
USPC .......................................................... 717/124
See application file for complete search history.

(56) References Cited

U.S. PATENT DOCUMENTS

| | | | |
|---|---|---|---|
| 6,865,692 B2 * | 3/2005 | Friedman et al. ................ | 714/25 |
| 7,028,223 B1 * | 4/2006 | Kolawa et al. ............. | 714/38.14 |
| 7,421,679 B2 * | 9/2008 | Hansen et al. ................ | 717/124 |
| 7,421,683 B2 * | 9/2008 | Robertson et al. ............ | 717/130 |
| 7,519,624 B2 * | 4/2009 | Korupolu et al. ...................... | 1/1 |
| 7,653,896 B2 * | 1/2010 | Herdeg, III .................... | 717/113 |
| 7,676,798 B2 * | 3/2010 | Snover et al. ................. | 717/139 |
| 7,793,154 B2 * | 9/2010 | Chagoly et al. ............ | 714/38.14 |
| 7,877,732 B2 * | 1/2011 | Day et al. ....................... | 717/124 |
| 7,979,846 B2 * | 7/2011 | Grechanik et al. ............ | 717/124 |
| 2006/0150026 A1 | 7/2006 | Kolawa et al. | |
| 2008/0058558 A1 | 3/2008 | Mack et al. | |
| 2008/0066009 A1 | 3/2008 | Gardner et al. | |
| 2008/0115112 A1 | 5/2008 | Sharma | |
| 2009/0019427 A1 * | 1/2009 | Li et al. ......................... | 717/126 |
| 2009/0319832 A1 * | 12/2009 | Zhang et al. .................... | 714/38 |

FOREIGN PATENT DOCUMENTS

WO  WO 2005082072 A2 * 9/2005

* cited by examiner

*Primary Examiner* — Don Wong
*Assistant Examiner* — Daxin Wu

(57) ABSTRACT

A computer-executed test tool combines testing of an application at a user interface layer and a web services layer. The computer-executed test tool comprises a capture tool that records a web services test concurrently with recording of a user interface test.

13 Claims, 8 Drawing Sheets

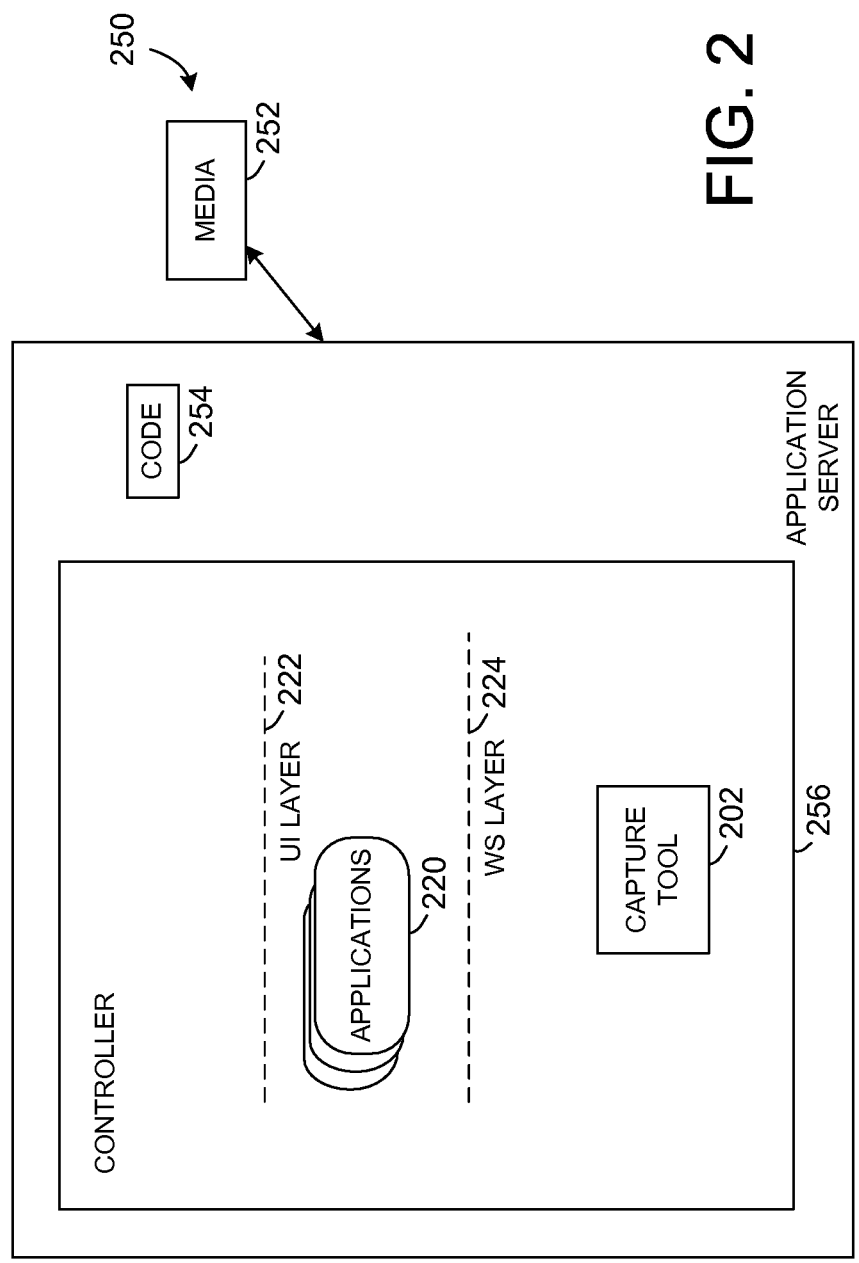

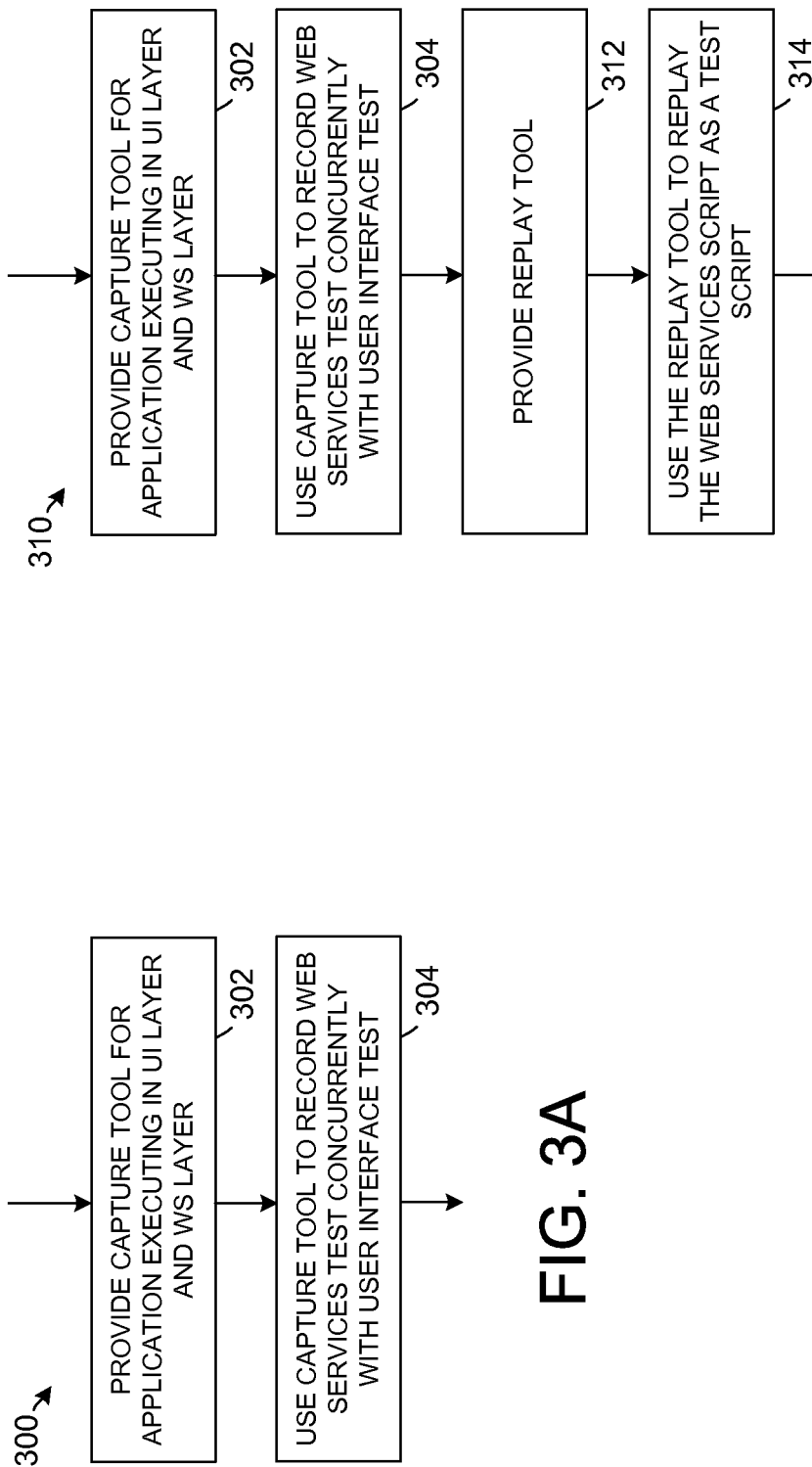

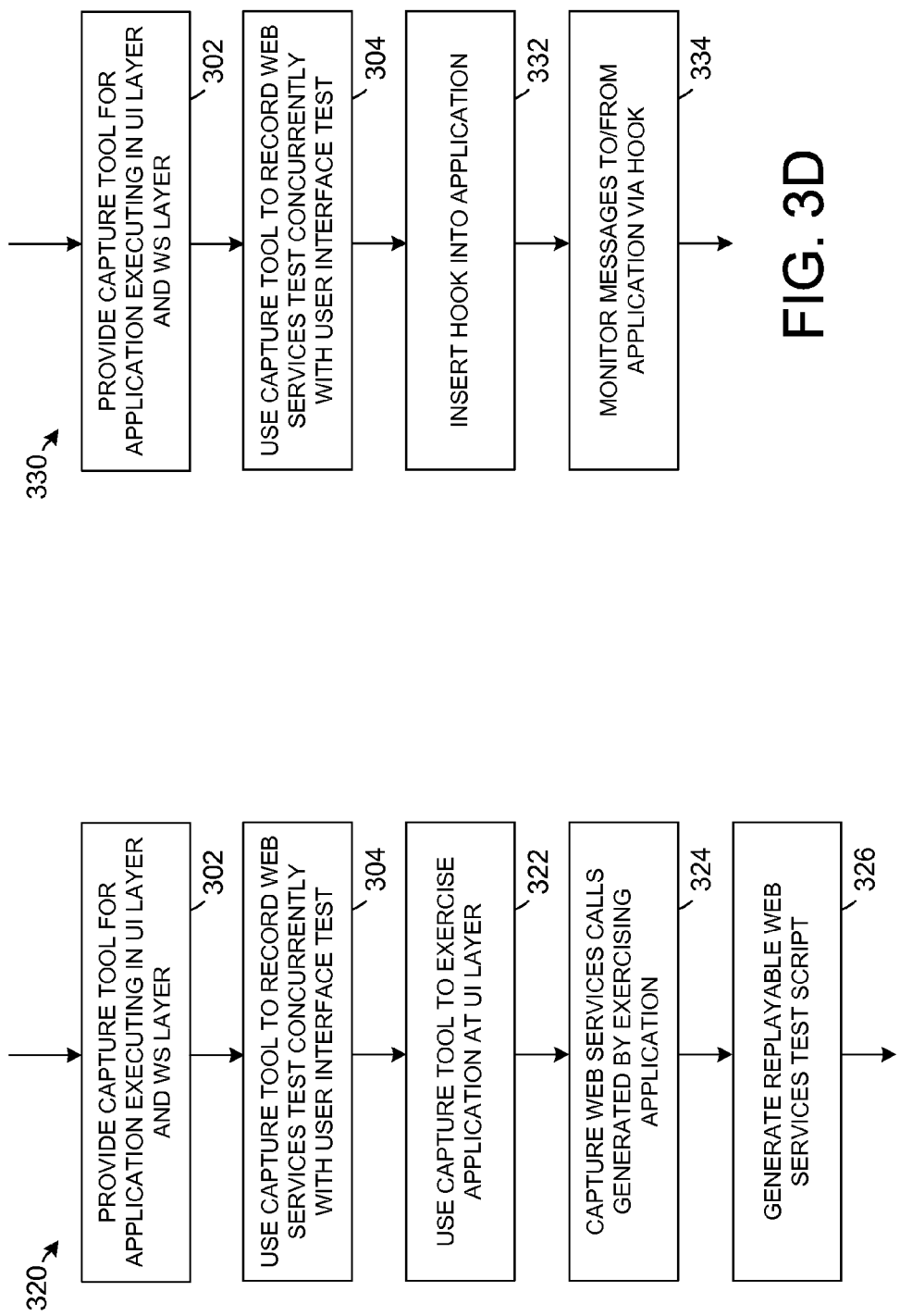

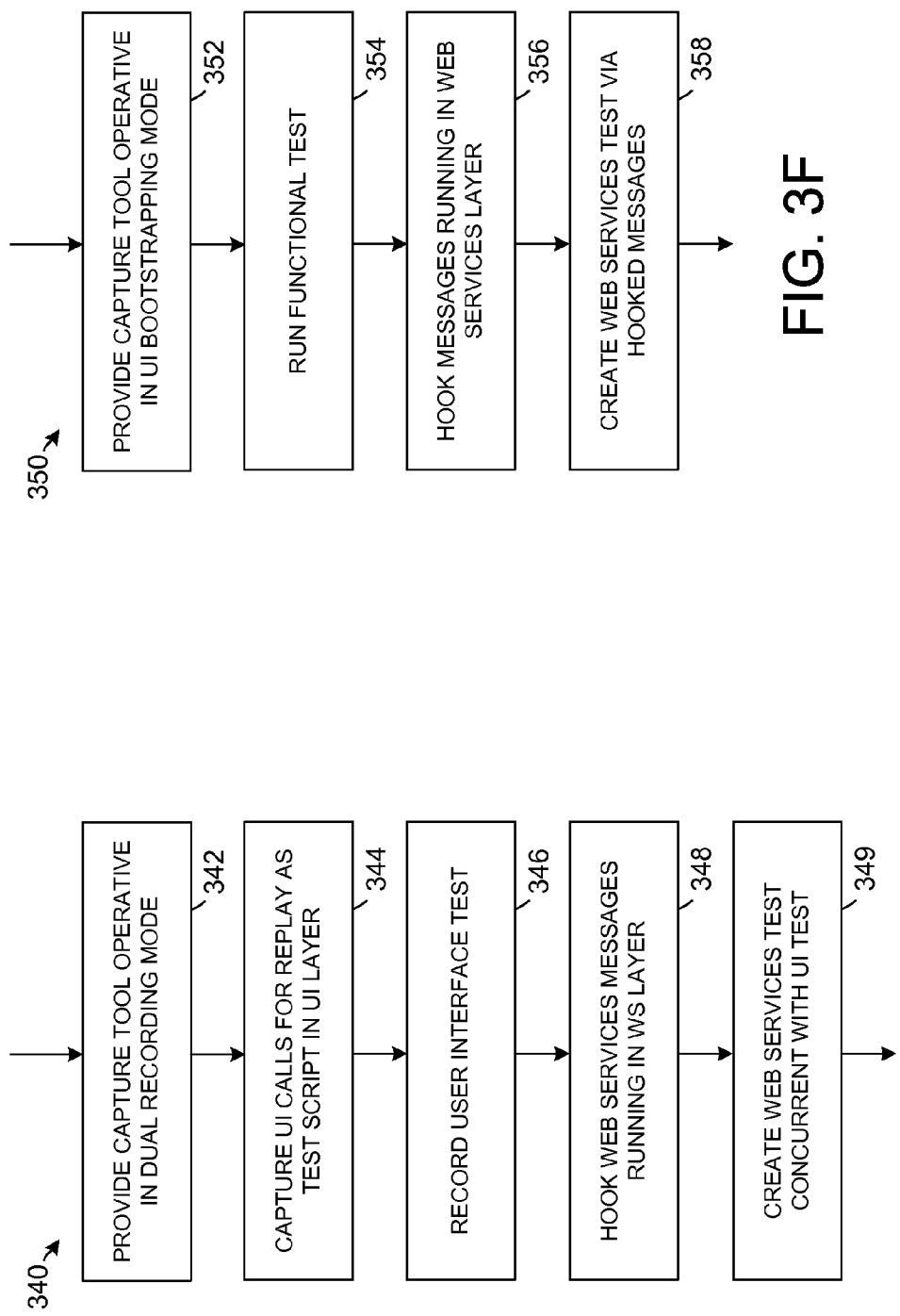

TEST TOOL FOR CONCURRENT WEB SERVICES AND USER INTERFACE TESTING

BACKGROUND

Web services applications are user interface (UI) applications that interact with web services. Usually, web services applications are used to manipulate and display data retrieved by web services or to send operation requests to web services. The web services applications are written by different UI tools and technologies and testing is supported by automated UI testing tools. Another set of automated testing tools exists which are dedicated for web services "raw" testing.

A web services application has two layers including an application or user interface (UI) layer, and a web services connection layer. Web services are used mostly by UI applications. The application layer exists on the top of the UI application. The UI application accesses web service(s) that in turn use other services such as a database to perform operations. Both user interfaces (UI) and web services (WS) can be tested.

A user or customer is limited in testing options and can either test only one of the two layers, or write two different tests, sometimes using two different tools. If using Web Services Descriptive Language (WSDL) interface file parsing to build a test, a user can manually fill arguments information, a laboriously and non-intuitive technique for performing the test.

Difficulty arises since web services automated tests are not sufficiently reliable and test only simple and straight-forward cases. For example, web services test generation can be done by parsing the web service interface file (WSDL) and allowing the user or customer to add operation steps to the script. The added operation arguments are empty and the user has to manually edit the arguments according to the expected arguments which are generated by the application. Web services tests are not recorded but edited according to the WSDL, therefore most web services tests behave as simple unit tests and not real-time, end-to-end tests. Building a web services test that uses the real-time operation calling order with the real-time arguments is a laborious and non-intuitive work.

SUMMARY

Embodiments of a computer-executed test tool combine testing of an application at a user interface layer and a web services layer. The computer-executed test tool comprises a capture tool that records a web services test concurrently with recording of a user interface test.

BRIEF DESCRIPTION OF THE DRAWINGS

Embodiments of the invention relating to both structure and method of operation may best be understood by referring to the following description and accompanying drawings:

FIG. 2 is a schematic block diagram depicts an embodiment of an article of manufacture that implements layered web services testing functionality;

FIGS. 3A through 3F, flow charts illustrate one or more embodiments or aspects of a computer-executed method for layered web services testing;

DETAILED DESCRIPTION

Embodiments of a system, article of manufacture, and operating method enable web services application layered testing.

The illustrative systems, articles of manufacture, and associated methods solve the difficulty of web services testing by generating parallel tests of the user interface layer and the web services layer. A user interface (UI) application test is formed that creates or records, in the background, a web services test. A user or customer can determine whether the UI layer and web services layer are operating correctly in combination so that, in case of unexpected behavior of the application, a test on the web services can be run separately to determine whether the web services is the offending layer, or whether the problem resides in the application layer. If a UI application test fails, the illustrative test tool and operating method facilitate investigation and determination of the source of the problem, whether in the user interface application or web services.

Correct operation in the UI application depends at least in part on proper functionality in the web services layer. Thus, in a UI application failure condition, successful passage of the web services test means almost certainly that the error is isolated to the UI application. Failure of the web services test results in more detailed information than is available from the results of UI application test failure. For example, the UI test results may indicate failure because the edit field with username is empty, while the web services test result indicates that the web services "Fetch User Credentials" failed on operation "get_username".

Accordingly, the depicted web services systems and techniques solve testing difficulties by creating a reliable web services test that reflects a real-user scenario. In case of failure of the UI application test, web services testing can be performed.

Isolating a problem to an offending layer is one aspect of the illustrative systems and methods. Another aspect of function is performance of a validation test of the web services layer after implementation changes. Typically, development teams in an organization or in multiple organizations develop user interface (application) tests and web services tests independently. The depicted systems and techniques enable an end-to-end test for the web services layer that allows a web services team to test and validate code after changes but before integration with a user interface development team. A successful run of the web services layer test confirms with a high degree of probability that the integration will not fail due to the changes in the web services implementation.

An example implementation may include integration of a UI application recording engine, for example from Quick-Test, with Service Oriented Architecture (SOA) testing test generation engine.

Figure 1A:
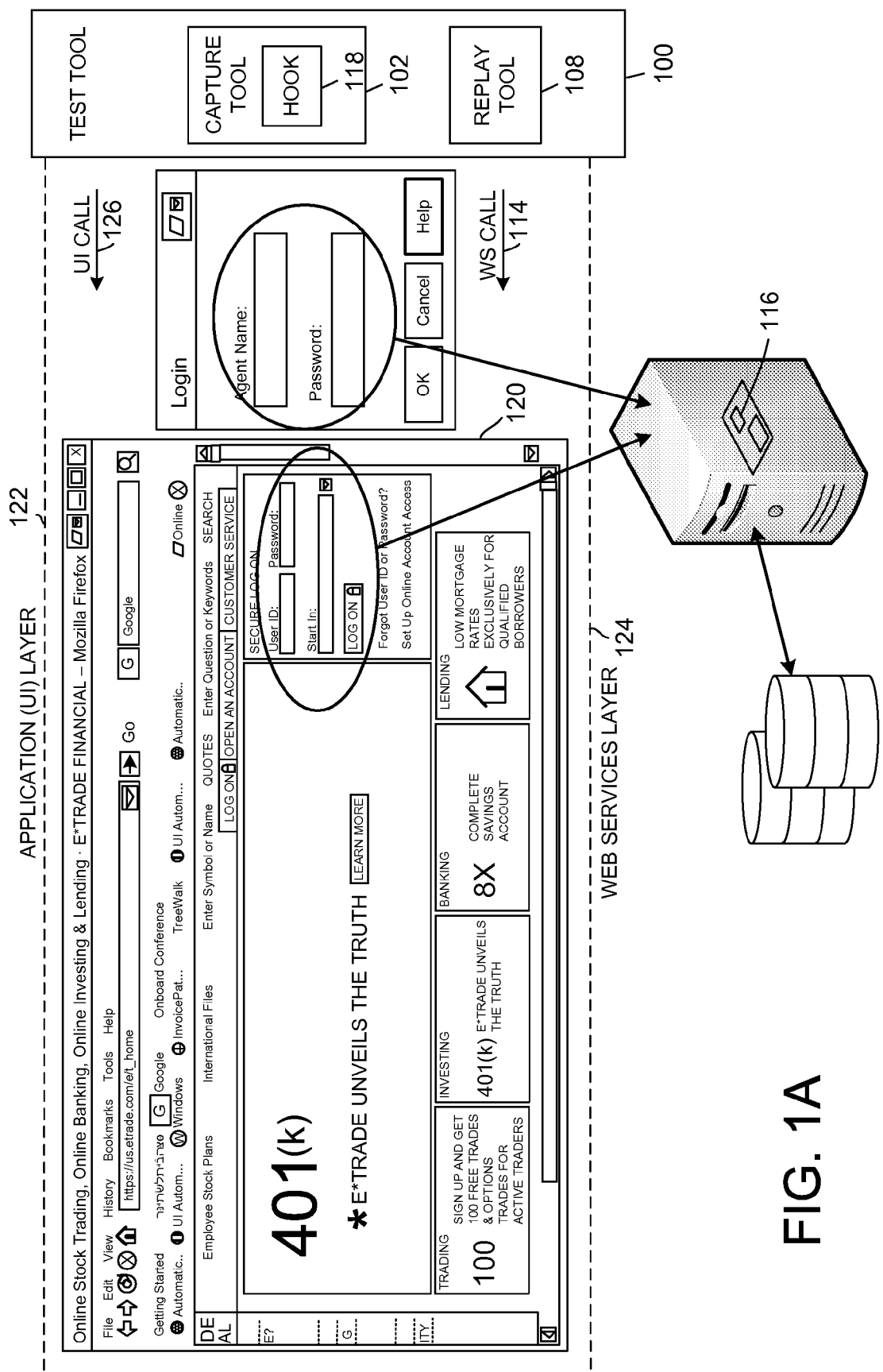
FIGS. 1A and 1B are schematic block and pictorial diagrams showing embodiments of systems that implement layered web services testing functionality.
Figure 1B:
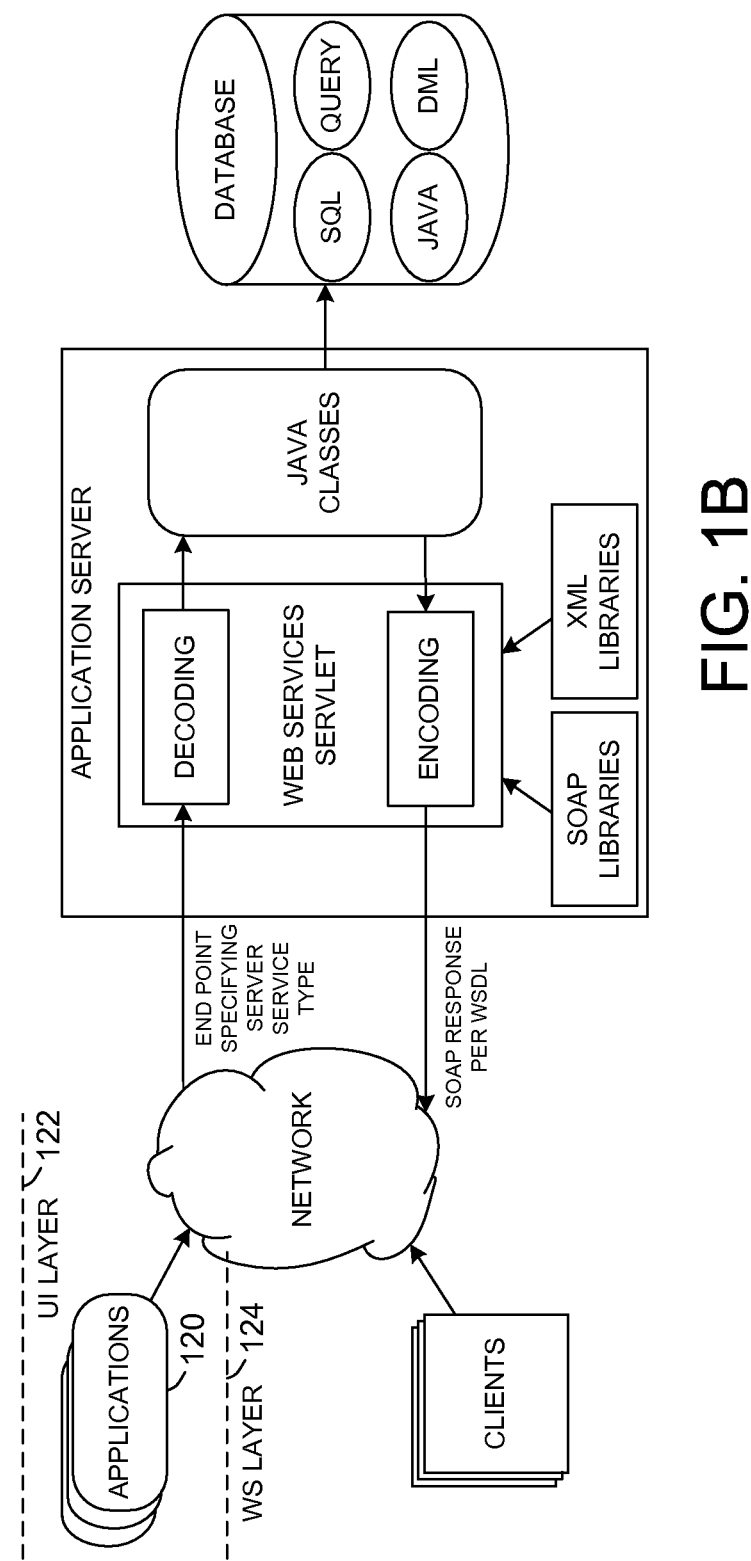

Referring to FIGS. 1A and 1B, schematic block and pictorial diagrams illustrate embodiments of a computer-executed test tool 100 that combine testing of an application 120 at a user interface layer 122 and a web services layer 124. The computer-executed test tool 100 comprises a capture tool 102 that records a web services test concurrently with recording of a user interface test.

The test tool 100 can further comprise a replay tool 108 that replays the web services test as a test script.

The capture tool 102 can exercise a user interface 122 and capture web services calls 114 that are generated by exercising the user interface 122 to generate a web services test script that is replayable.

The capture tool 102 can be implemented as logic 116 that inserts a hook 118 into a user interface (UI) application 120 and monitors, through operation of the hook 118, messages the application 120 sends before the sent message is encrypted and messages the application 120 receives after the received message is decrypted. Hooking is a computer programming technique that employs "hooks" to form a chain of procedures that operate as an event handler. After the handled event occurs, control flow follows the chain in a specified order. A hook 118 operates by registering the hook's address as handler for the event to be handled and at some point, usually at the end of event handling, calls the original handler for the event. Each hook passes execution to the previous handler in the chain, eventually arriving at a default handler. "Unregistering" the hooks is defined as setting the original procedure as the event handler.

The hook 118 can be triggered or activated, for example, in developing an application using web services. A web services communication library or toolkit can be used to expose a programmatic interface that forms a web services message according to a web services standard and performs the raw communication of sending and receiving byte streams by Transmission Control Protocol/Internet Protocol (TCP/IP). In a coding example, a hook can be activated using a java web services (WS) toolkit as follows:

```
Service service = new Service();
Call call = (Call)service.createCall();
String endpoint=http://localhost:8080/axis/NHLService.jws;
call.setTargetEndpointAddress(new URL(endpoint));
call.setOperationName(newQName("getCurrentPosition"));
String division = args[0];
String team = args[1];
String position=(String)call.invoke(newObject[ ] {new
    String(division), new String(team)});
```

The final line (String position=(String)call.invoke(newObject[ ] {new String(division), new String(team)}) composes a message using the given arguments and sends the message to the web services server, parses the response and returns the parsed response to the calling application as a fancy string, given as the return value.

Several common toolkits are available including, for example, .Net for .Net developers, and Axis in Java and C++ languages. Some of the toolkits enable developers to supplement functionality by registering "event listeners" which are also known as "hooks". Such supplementation enables a developer to use most functionality supported by the toolkit while enabling modification of a specific new functionality. Such hooks create a "backdoor" that enables listening and tracing of toolkit activity on the client or application side.

The hooking mechanism can be enabled by the user when recording or replaying a test on the UI application. Every request and response can be hooked, thus a Web Services test can be created behind the operations collecting real user data.

Because different web services testing tools exist, different clients can connect to the hooks, and use the hooks to edit a test of a desired format.

The capture tool 102 can operate in a dual recording mode in the user interface layer 122 and the web services layer 124 wherein user interface calls 126 are captured for replay as a test script in the user interface layer 122. When the user interface test is recorded, web services messages running in the web services layer 124 are hooked for creation of the web services test concurrent with the user interface test.

The capture tool 102 can also or alternatively operate in a user interface bootstrapping mode in the user interface layer 122 and the web services layer 124 wherein during a functional test run in the user interface layer 122, web services messages running in the web services layer 124 are hooked for creation of the web services test.

In various embodiments, the test tool 100 implement either the dual recording mode or interface bootstrapping mode, or other suitable mode. Some implementations of the test tool 100 can support multiple operating modes and enable user selection among the modes.

In some configurations, the test tool 100 can also include the application 120 that operates in the user interface layer 122 and the web services layer 124. The capture tool 102 executes in the application 120 to enable monitoring of messages sent by the application 120 before encryption and messages received by the application 120 after decryption.

The illustrative test tool 100 for web services testing is supported by the automated testing tools technology. A test combines an application user interface (UI) test, in any UI testing tool format, and a web services test in any Web services testing tool format.

In a particular example embodiment, the test tool 100 can be implemented using a user interface application recording engine that records user interface calls for replay as a test script, and a service oriented architecture (SOA) test generation engine integrated with the user interface application recording engine. One suitable recording engine is supplied as part of QuickTest Professional™ which is produced by Hewlett-Packard Company of Houston, Tex.

A test script is a set of instructions that can be performed by a system-under-test to verify that the system functions as expected. The steps can be executed manually or automatically. The illustrative test tool 100 writes the test scripts as a short program by operation of an automated functional graphical user interface (GUI) such as Hewlett-Packard QuickTest Professional™ or other GUI systems. Test scripts are typically written in a standard programming language.

QuickTest Professional (QTP) is an automated GUI testing tool that enables automation of user actions on a web-based or client-based computer application, for example functional regression test automation. QTP uses a scripting language to specify a test procedure, and manipulate objects and controls of the application under test. QTP identifies objects in the application UI or web page and performs selected operations on the objects. QTP supports recording-and-playback wherein a user's actions are captured using Microsoft's Component Object Model (COM) and recorded into a type of subroutine called an action as script commands. The user can operate the GUI to play back selected actions.

The capture tool 102 can be used in combination with the recording and playback capabilities of QTP to enable concurrent recording at both the user interface and web services levels.

The test tool 102 can create the application layer and the web services layer tests in parallel, and update and maintain the web services layer test according to changes in the application layer test.

The test tool 102 can perform a web services test by parsing a web services interface file in a web services descriptive language (WSDL), automatically connecting to the hooks 118, and accessing test data in real-time operation calling order with real-time arguments.

In another example operation, the test tool 102 can test the application 120 at the application layer 122. If failure is detected in the application layer test, the test tool 102 can respond to the detected failure by testing the application 120 at the web services layer 124, thereby isolating the failure to the application layer if the web services layer testing passes.

The test tool 102 can facilitate manual testing by a user by enabling the user to disable the hook 118 for recording and replay a test on the application 120.

The illustrative test tool 102 enables two correlated tests for the same functionality in different layers, facilitating isolation of a defect domain.

The test tool 102 also enables Web Services tests to be created automatically by connecting to application hooks.

The test tool 102 further enables real-time web services tests to be automatically created, even if a security mechanism is defined.

Referring to FIG. 2, a schematic block diagram depicts an embodiment of an article of manufacture 250 that implements layered web services testing functionality. The illustrative article of manufacture 250 comprises a controller-usable medium 252 having a computer readable program code 254 embodied in a controller 256 for testing a web services application 220. The computer readable program code 254 causes the controller 256 to insert a capture tool 202 into an application 220 that concurrently executes in a user interface layer 222 and a web services layer 224. The program code 254 further causes the controller 256 to record, by operation of the capture tool 202, a web services test concurrently with recording of a user interface test.

Referring to FIGS. 3A through 3F, flow charts illustrate one or more embodiments or aspects of a computer-executed method for layered web services testing. FIG. 3A depicts a computer-executed method 300 for testing a web services application comprising providing 302 a capture tool for insertion into an application that concurrently executes in a user interface layer and a web services layer, and using 304 the capture tool to record a web services test concurrently with recording of a user interface test.

Referring to FIG. 3B, an embodiment of a layered web services testing method 310 can further comprise providing 312 a replay tool, and using 314 the replay tool to replay the web services test as a test script.

Referring to FIG. 3C, an embodiment of a layered web services testing method 320 can further comprise using 322 the capture tool to exercise the application at the user interface layer and capture 324 web services calls generated by exercising the application to generate 326 a web services test script that is replayable.

As shown in FIG. 3D, a testing method 330 can comprise providing 302 the capture tool that inserts 332 a hook into the application and monitors 334, through operation of the hook, messages the application sends before the sent message is encrypted and messages the application receives after the received message is decrypted.

FIG. 3E illustrates a testing method 340 in a dual recording mode. The illustrative method 340 can comprise providing 342 the capture tool which operates in a dual recording mode in a user interface layer and a web services layer wherein user interface calls are captured 344 for replay as a test script in the user interface layer and, when the user interface test is recorded 346, web services messages running in the web services layer are hooked 348 for creation 349 of the web services test concurrent with the user interface test.

FIG. 3F illustrates a testing method 350 in a dual recording mode. The illustrative method 350 can comprise providing 352 the capture tool operative in a user interface bootstrapping mode in a user interface layer and a web services layer wherein during a functional test run 354 in the user interface layer, web services messages running in the web services layer are hooked 356 for creation 358 of the web services test.

Figure 4:
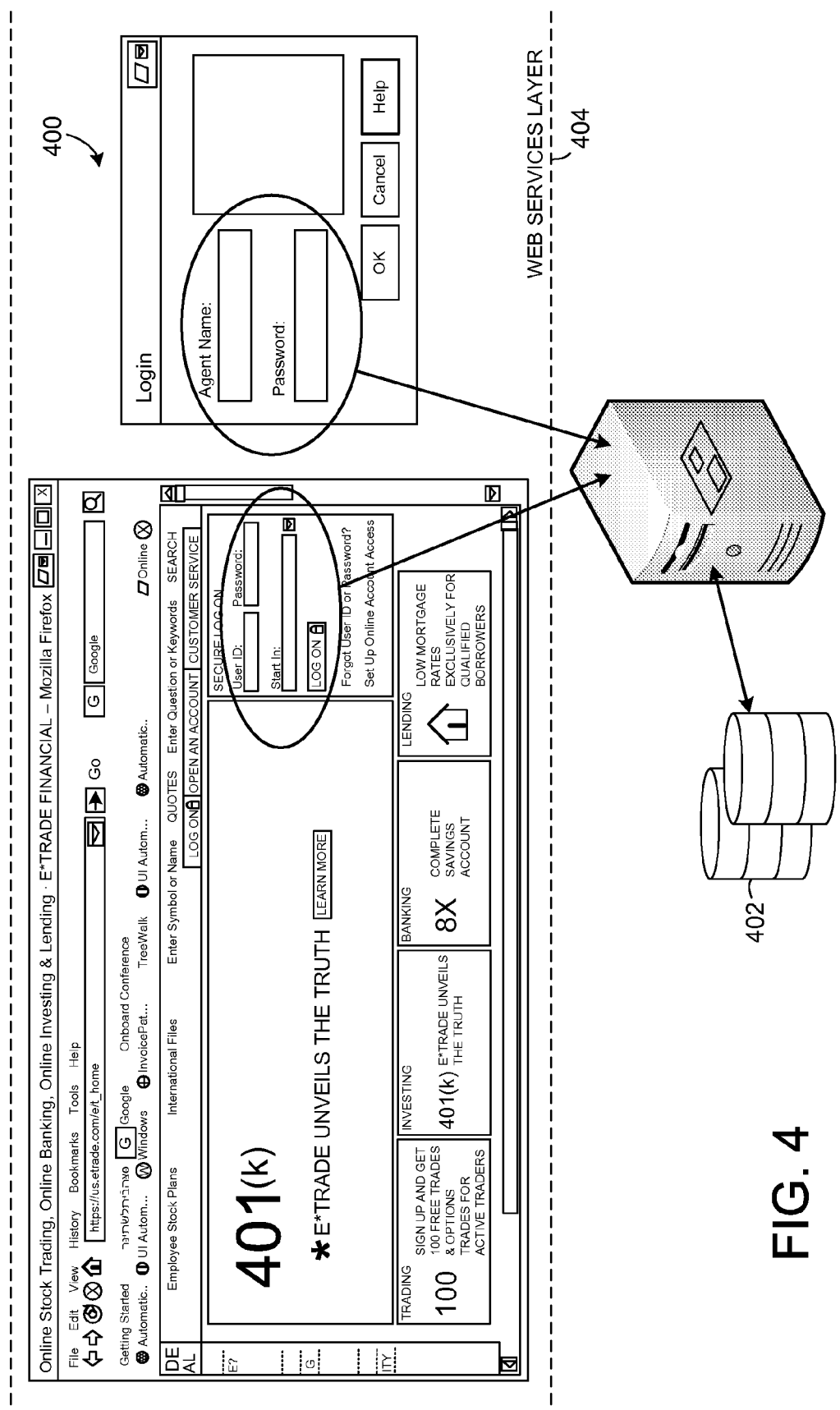
FIG. 4 is a pictorial and block diagram showing a web services applications structure.

Referring to FIG. 4, a pictorial and block diagram shows a web services applications structure 400. Various applications access a web service to perform business specific actions. The web service performs the requested actions based on internal algorithms and database 402 access in a web service layer 404.

Figure 5:
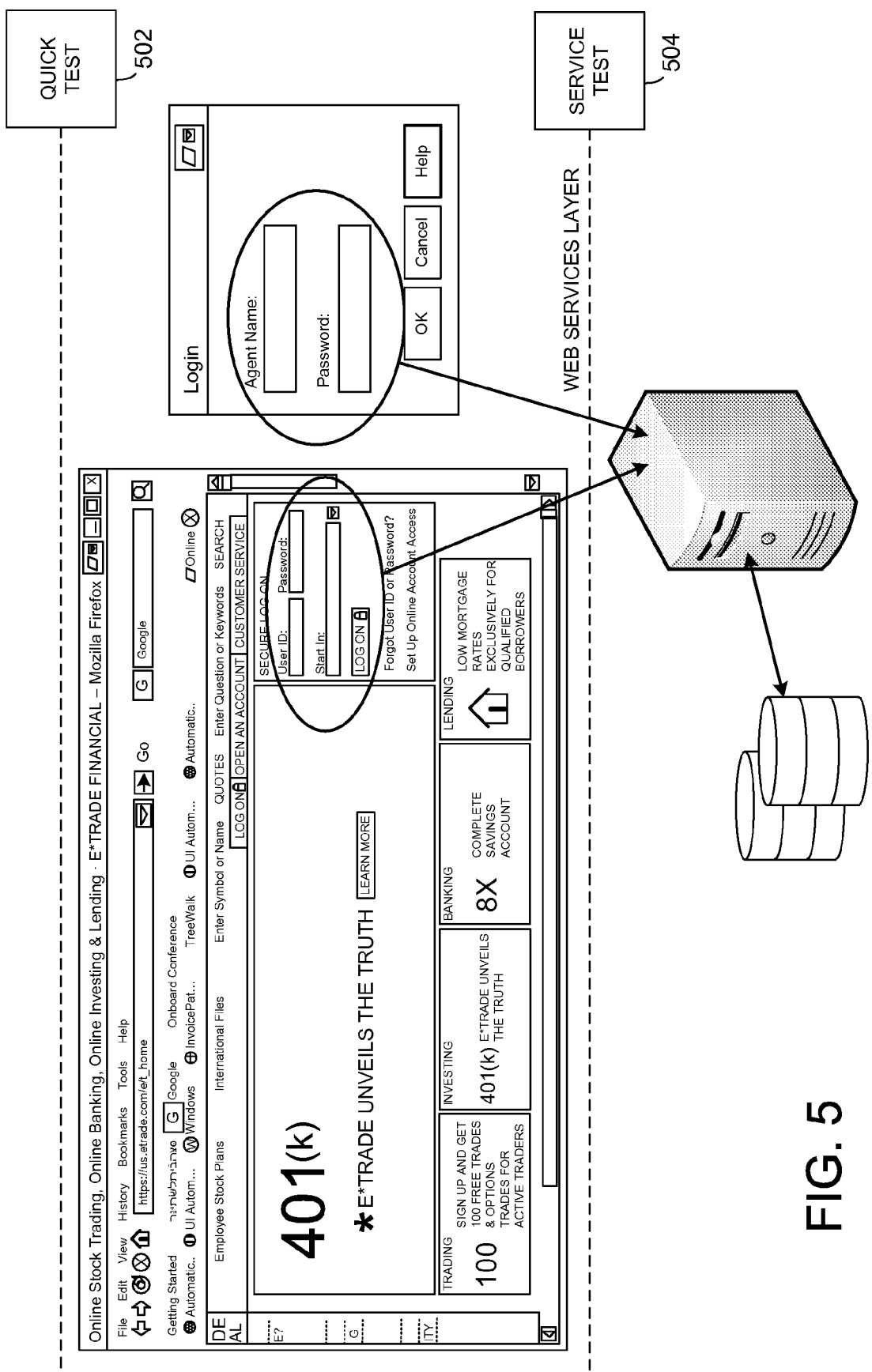
FIG. 5 is a diagram depicting web services testing tools.

Referring to FIG. 5, web services applications are typically tested using two separate tools including a functional testing tool for the user interface, for example a QuickTest 502, and a web services testing tool for testing the web service 504. Web services tests 504 do not typically follow a logical "business process" flow. On functional test failure, a question arises regarding the source of the failure, either the user interface or the web service. A web services test 504 may pass although the applications are unusable due to un-tested sequence of web service calls.

The illustrative system and technique enable creation of both web services and functional tests in a single process. Web services naturally follow a "business process" flow. The system and method facilitate detection of the test failure source.

The illustrative testing tools can be implemented in various different configurations such as GUI testing tools and WS-dedicated testing tools, and used both to create and run tests. An example of a GUI testing tool is QuickTest Professional. An example of a WS-dedicated testing tool is Hewlett-Packard service oriented architecture (SOA) test solution.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A computer-executed test tool comprising:
a capture tool, implemented via a processor, to:
record a web services test concurrently with recording of a user interface test, recording the user interface test comprising recording user interface calls;
exercise a user interface; and
capture web services calls generated by exercising the user interface to generate a web services test script that is replayable.

2. The computer-executed test tool according to claim 1 further comprising
a replay tool to replay the web services test as a test script.

3. The computer-executed test tool according to claim 1 wherein
the capture tool is to insert a hook into a user interface (UI) application and is to monitor, through operation of the hook, messages the UI application sends before the sent message is encrypted and messages the UI application receives after the received message is decrypted.

4. A computer-executed test tool, comprising:
a capture tool, implemented via a processor, to:
concurrently record a web services test and record a user interface test, recording the user interface test comprising recording user interface calls;
operate in a dual recording mode in a user interface layer and a web services layer;
capture user interface calls for replay as a test script in the user interface layer; and
when the user interface test is recorded, hook web services messages running in the web services layer for creation of the web services test concurrent with the user interface test.

5. The computer-executed test tool according to claim 1 wherein
the capture tool is to operate in a user interface bootstrapping mode in a user interface layer and a web services layer, wherein during a functional test run in the user interface layer, web services messages running in the web services layer are hooked for creation of the web services test.

6. The computer-executed test tool according to claim 1 further comprising
an application to operate in a user interface layer and a web services layer, the capture tool to execute in the application to monitor messages sent by the application before encryption and messages received by the application after decryption.

7. The computer-executed test tool according to claim 1 further comprising:
a user interface application recording engine to record the user interface calls for replay as a test script; and
a service oriented architecture (SOA) test generation engine integrated with the user interface application recording engine.

8. A computer-executed test method comprising:
providing a capture tool for insertion into an application that concurrently executes in a user interface layer and a web services layer;
using the capture tool to concurrently record a web services test and record a user interface test, recording the user interface test comprising recording user interface calls; and
using the capture tool to exercise the application at the user interface layer and capture web services calls generated by exercising the application to generate a web services test script that is replayable.

9. The computer-executed test method according to claim 8 further comprising:
providing a replay tool; and
using the replay tool to replay the web services test as a test script.

10. The computer-executed test method according to claim 8 further comprising:
using the capture tool to insert a hook into the application and to monitor, through operation of the hook, messages the application sends before the sent message is encrypted and messages the application receives after the received message is decrypted.

11. The computer-executed test method according to claim 8 further comprising:
operating the capture tool in a dual recording mode in a user interface layer and a web services layer, wherein user interface calls are captured for replay as a test script in the user interface layer and, when the user interface test is recorded, web services messages running in the web services layer are hooked for creation of the web services test concurrent with the user interface test.

12. The computer-executed test method according to claim 8 further comprising:
operating the capture tool in a user interface bootstrapping mode in a user interface layer and a web services layer, wherein during a functional test run in the user interface layer, web services messages running in the web services layer are hooked for creation of the web services test.

13. A tangible computer readable storage device comprising
computer readable instructions which, when executed by a processor, cause the processor to at least:
insert a capture tool into an application to concurrently execute in a user interface layer and a web services layer;
record, via the capture tool, a web services test concurrently with recording of a user interface test, recording the user interface test comprising recording user interface calls; and
use the capture tool to exercise the application at the user interface layer and capture web services calls generated by exercising the application to generate a web services test script that is replayable.

* * * * *